Patented Nov. 17, 1925.

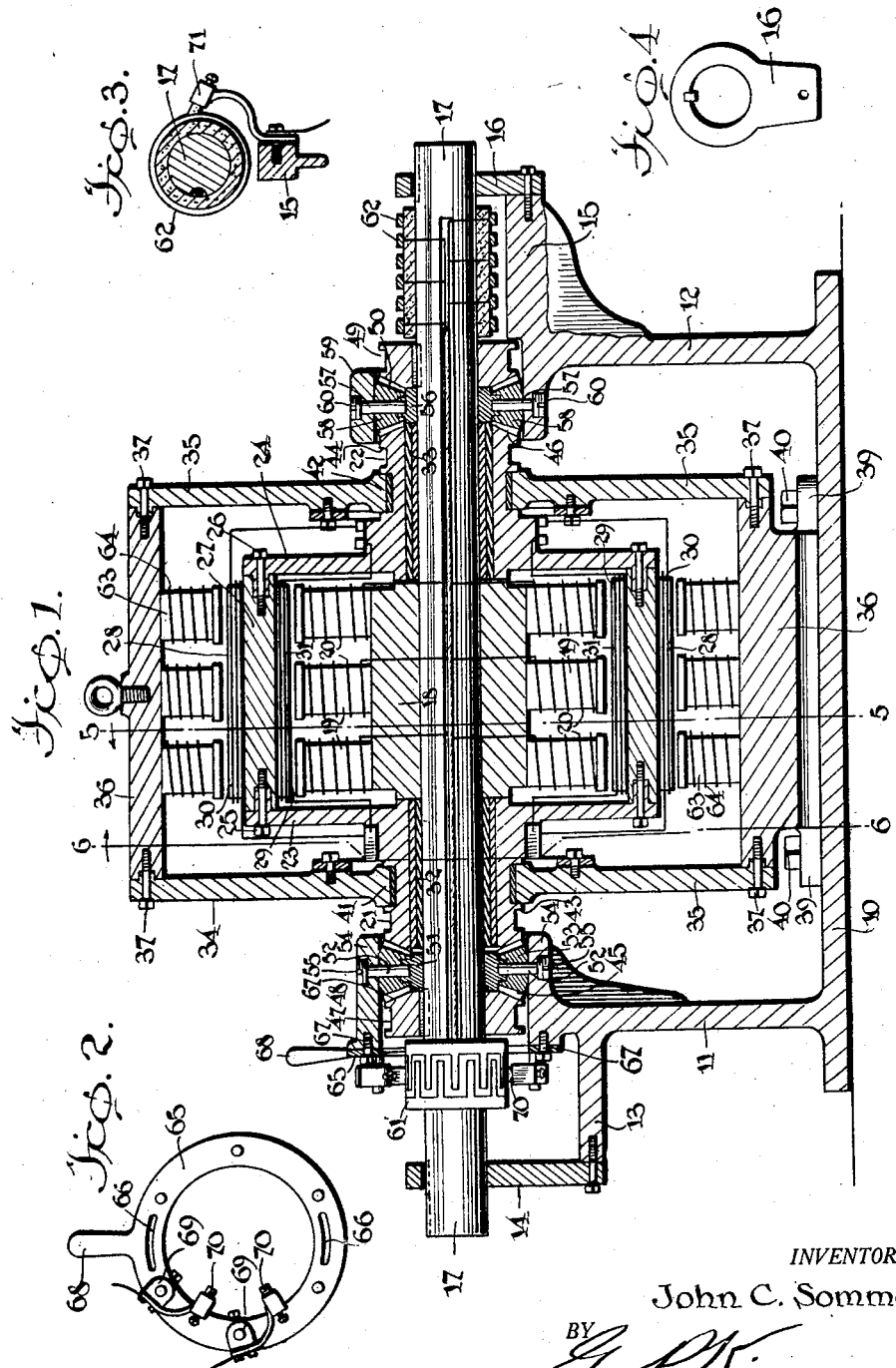

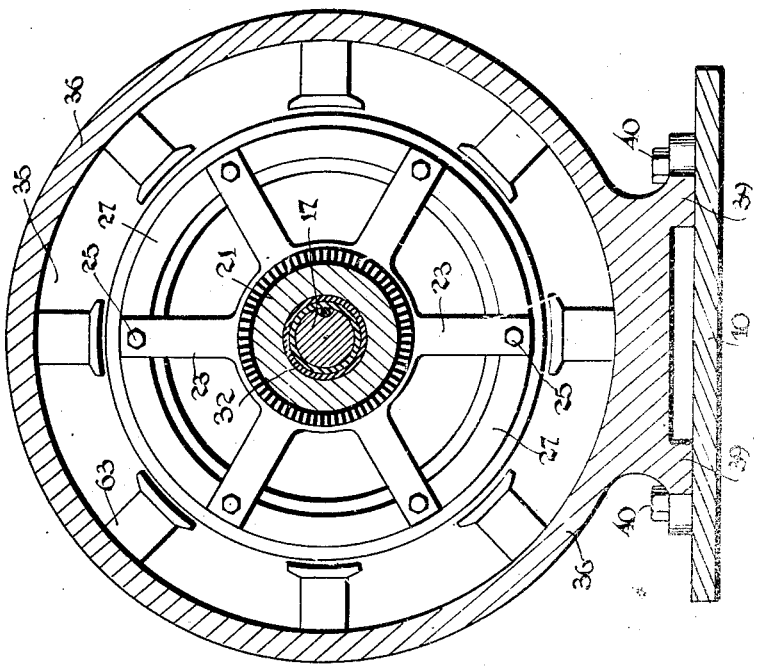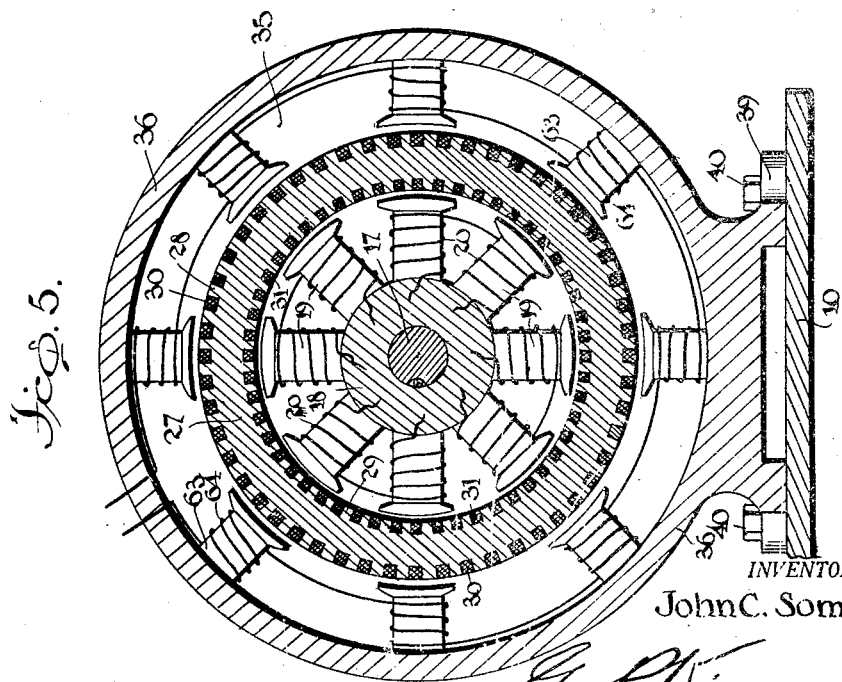

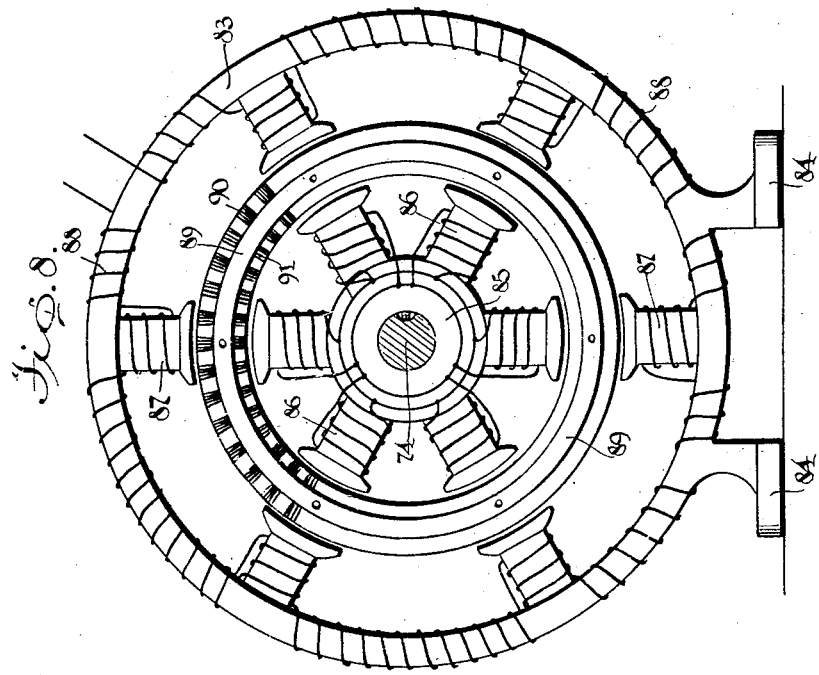
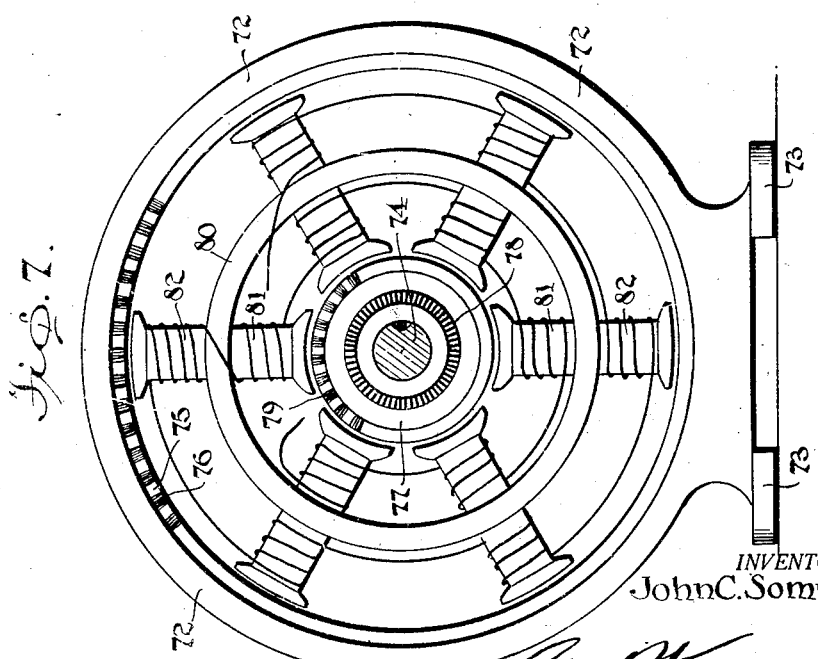

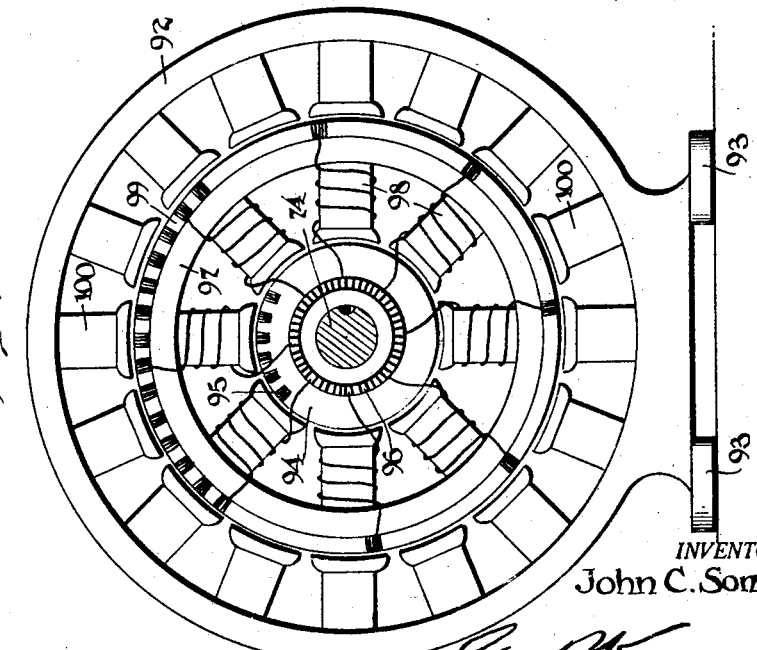

1,562,263

UNITED STATES PATENT OFFICE.

JOHN C. SOMMER, OF ST. LOUIS, MISSOURI.

ELECTRO MOTOR AND GENERATOR.

Application filed June 16, 1924. Serial No. 720,308.

*To all whom it may concern:*

Be it known that I, JOHN C. SOMMER, a citizen of the United States, residing at St. Louis, in the county of St. Louis City and State of Missouri, have invented certain new and useful Improvements in Electro Motors and Generators, of which the following is a specification.

This invention relates to electric motors and generators, and has for one of its objects to improve the construction and increase the efficiency and utility of devices of this character.

Another object of the invention is to provide a device of this character, including outer and inner members so geared that the outer member rotates in a clockwise direction, and the inner member rotates in anticlockwise direction, and reversible, so that the outer member will rotate in an anticlockwise direction, and the inner member rotate in a clockwise direction.

Another object of the invention is to provide a device of this character, including three members, an outer stationary member, an inner member rotatable in one direction and an intermediate member rotatable in the opposite direction.

With these and other objects in view the invention consists in certain novel features of construction as hereinafter shown and described and then specifically pointed out in the claims, and in the drawings illustrative of the preferred embodiment of the invention—

Figure 1 is a longitudinal sectional elevation.

Figure 2 is a detached detail of the brush holder and support.

Figure 3 is a sectional detail of the collector ring and one of the brushes of the same.

Figure 4 is a side elevation of one of the brake devices.

Figure 5 is a section on the line 5—5 of Figure 1, looking in the direction of the arrow.

Figure 6 is a section on the line 6—6 of Figure 1, looking in the direction of the arrow.

Figures 7 and 8 and 9 illustrate modifications in the construction.

Figures 10 and 11 are diagrammatic views illustrating the system of wiring.

The improved apparatus comprises a support including a base portion 10 and vertical spaced standards 11—12. A main horizontal shaft 17 comprises a part of the improved device, and mounted on the shaft and rotatable therewith is an inner member including a hub portion 18 fast to the shaft and a plurality of radially disposed electric magnet core members 19, which may be integral with the hub or attached thereto as may be preferred, the wiring of the magnets being indicated conventionally at 20. Extending outwardly from the standards 11 and 12 are projections 13 and 15. Attached to the outer end of the projection 13 is a brake block 14, while a similar brake block 16 is attached to the outer end of the projection 15, the object to be hereafter explained.

Mounted for rotation on the shaft 17 at the ends of the hub 18 and bearing against the same are other hubs or sleeves 21—22, and extending respectively from the sleeves at their confronting ends are arms 23 and 24, the latter connected at their outer ends as at 25 and 26 to an annular member 27.

The outer and inner faces of the member 27 are respectively formed with transverse spaced channels producing spaced lands or ribs 28 and 29 which constitute oblong cores to support conductor wires, indicated conventionally at 30 and 31.

The hubs 21—22 are preferably provided with wear bushings, indicated at 32 and 33.

Enclosing the member 27 is a shell or casing comprising end members 34 and 35 and an annular member 36 attached to the end members at 37, the member 36 being formed with foot elements 39 attached to the base 10 as shown at 40.

The end portions 34 and 35 of the shell are formed respectively with bearings 41—42 engaging the sleeves 21 and 22, and formed on the sleeves next to the end members 34 and 35.

The sleeves 21 and 22 together with the wear bushings 32 and 33 in coaction with the end members 34 and 35 and foot 39 of the shell, constitute supports for the shaft, as shown.

The portions of the sleeves 21 and 22 adjacent to the end members 34 and 35 constitute band pulleys, and are provided with belt guide flanges 43 and 44.

The outer end of the sleeve 21 is formed with bevel gear teeth 45, while the sleeve 22 is formed on its outer end with like bevel gear teeth 46.

Mounted on the shaft 17 and rotative therewith and spaced from the sleeve 21, is a belt pulley 47 having bevel gear teeth 48 arranged reversely to the teeth 45, and mounted on the shaft 17 and spaced from the sleeve 22 is a belt pulley 49 having bevel gear teeth 50 arranged reversely to the teeth 46. Mounted on the shaft 17 between the sleeve 21 and the belt pulley 47 is a collar device 51 having a plurality of radially directed studs 52, each carrying a bevel pinion 53 in constant engagement with the bevel gears 45 and 48. Formed upon the standard 11 is a housing member 54 within which the bevel pinions 53 operate and in which the outer ends of the studs 52 are received and held in place by clamp nuts 55. By this arrangement the bevel gear pinions 53 are retained in rotative relation with the teeth of the sleeve 21 and pulley 47.

Mounted on the shaft 17 between the sleeve 22 and the belt pulley 49 is a collar device 56 having a plurality of radially directed studs 57, each carrying a bevel pinion 58 in constant engagement with the bevel gears 46 and 50. Formed upon the standard 12 is a housing member 59 within which the bevel pinions 58 operate and in which the outer ends of the studs 57 are received and held in place by clamp nuts 60. By this arrangement the bevel gear pinions 58 are retained in rotative relation with the teeth 46 of the sleeve 22 and pulley 49.

Thus when rotative force is applied to the belt pulleys 47 and 49 in one direction the member 18 and its attachments will be rotated in the same direction while the sleeves 21 and 22 and the attached annular member 27 and its attachments will be rotated in the opposite direction through the coaction of the bevel pinions 53 and 58 and bevel gears 45 and 46, and the shell 36 and its attachments will remain stationary.

Then by reversing the direction of motion of the drive pulleys, the direction of motion of the rotative members will also be reversed, as will be obvious.

Mounted on the shaft 17 near one end is a commutator device represented conventionally at 61, while a collector ring device is mounted on the shaft 17 near the other end and represented conventionally at 62.

Extending inwardly from the annular portion 36 of the stationary shell are a plurality of electromagnets comprising core members and the usual wiring and represented conventionally at 63 and 64.

Mounted to oscillate on the outer face of the housing 54 is a ring member 65 having segmental slots 66 to receive studs 67 tapped into the adjacent face of the housing 54. The member 65 is provided with a projecting handle 68 by which it may be rotatively adjusted within the range of the slots 66.

Attached to the ring member 65 are brackets 69, and coupled to each bracket is a resiliently supported brush device represented conventionally at 70, and coacting with the commutator 61.

In Figure 3 is shown a detail of one of the collector brushes 71 of the collector rings 62.

In Figure 7 is shown a modified construction of the device, and including an enclosing shell 72 with attaching feet 73 corresponding to the shell 36 and its feet 39, and a through shaft 74 corresponding to the shaft 17.

Formed in the inner face of the shell member 72 are a plurality of spaced channels to produce core members indicated at 75 and adapted to receive conductor wires, indicated conventionally at 76, and thus constitute a plurality of small oblong electromagnets.

Mounted on the shaft 74 and rotative therewith is an inner member 77 having a commutator, indicated conventionally 78, and selector rings, represented conventionally at 79. Mounted on the shaft 74 and rotative thereon is an annular member 80 having a plurality of inwardly directed electromagnets represented conventionally at 81, and coacting with the selector rings 79.

Extending outwardly from the annular member 80 are a plurality of electromagnets indicated conventionally at 82, and coacting with the electromagnets 75—76. The members 77 and 80 will be arranged for rotation in opposite directions in the same manner as shown in Figure 1.

In Figure 8 another modified construction is shown comprising a shell member 83 having attaching feet 84 for supporting it on a suitable base, and similar to the members 36 and 72.

Mounted on the shaft 74 and rotative therewith is an inner member 85 having a plurality of electromagnets represented conventionally at 86 extending radially therefrom.

Directed inwardly from the shell member 83 are a plurality of electromagnets indicated conventionally at 87, and coupled by wiring indicated at 88 and encompassing the shell member 83 as shown.

Mounted on the shaft 74 and rotative thereon is an annular member 89 having a plurality of relatively small oblong electromagnets formed in its outer and inner face, and indicated conventionally at 90 and 91, and coacting with the electromagnets 86 and 87.

In Figure 9 another modified construction is shown, comprising an annular shell member 92 having attaching feet 93 for supporting it on a suitable base, and similar to the members 36, 72, and 83. Mounted on the shaft 74 and rotative therewith is an inner member 94 having selector members 95 and commutator members 96.

Mounted on the shaft 74 and rotative thereon is an annular member 97 having a plurality of electromagnets 98 extending inwardly therefrom and coacting with the selector members 95, and with a plurality of relatively small oblong electromagnets, represented conventionally at 99 on the outer face, and coacting with electromagnets represented conventionally at 100 and extending inwardly from the shell member 92.

The members 94 and 97 will be arranged for rotation in opposite directions in the same manner as shown in Figure 1.

By the arrangement shown the armature coils are connected to the commutator segments and collector rings so that the currents generated in the coils flows from the coils to one coacting brush on the main line and returns by the other brush to the coils. The manner of connecting may be varied relative to the number of poles and the number of coils of the armatures and the number of brushes, it being understood that any desired number of pairs of poles, and any number of armature coils and any number of brushes may be employed for motor or generator, or the work for which they are to be used.

The braking blocks 14 and 16 are to be used when the apparatus is to be operated with the inner member stationary, and are therefore detachable.

Two conductors are employed with each set of the encircling magnets and are carried in channels in the shaft 74, and are preferably insulated and in the form of a cable, as indicated in Figure 1.

In the modification shown in Figure 9, the intermediate member 97 is formed with an armature winding on the outer circumference and magnets on the inner circumference and the windings of the armature coils connected to the windings of the magnets.

A number of the coils of the armatures may be connected to the winding of the magnets so that the currents generated in the wires flows around the magnet cores and makes them electromagnets of alternating polarity.

The wearing parts are few and worn parts easily replaced without discarding the unimpaired portions.

When the intermediate rotative member is arranged with a double electric field, as shown in Figure 9, it is provided both with a connector ring bearer device and a commutator, so that the device can be made with either a field having a permanent polarity or a field with changing poles.

When the intermediate member is formed with an inner and outer armature, as shown in Figure 8, a connector ring bearer can be associated with one armature and a commutator associated with the other, so that both kinds of current can be collected.

The commutators are externally of the intermediate member thus making it convenient to adjust the brushes, while the commutators and connector ring bearer of the inner rotatable member are externally of the gearing, for the same purpose.

It will be noted that none of the brushes are connected to the revolving members, but are attached to the stationary members.

By this arrangement shown the connector ring bearer is toward one end of the device and the commutator toward the other end, thus making it possible to collect either direct or alternating current, as required, when employed as a generator.

By the arrangement shown with two pulleys at each end, two sets of machinery can be rotated in a clockwise direction, and two sets operated in an anti-clockwise direction, or the apparatus provided with four independent drive belts.

The wiring may be so arranged and provided with controller switches to enable the apparatus to be all operated in the same direction, or in opposite directions, as preferred.

By the arrangement shown, both members are rotative and each member exerting power either on separate pulleys, or both members operating the same shaft in the same direction.

By the arrangement shown, the intermediate member may be coupled to drive machinery, and the inner member held stationary by a suitable brake, or vice versa, as may be preferred.

By the arrangement shown the inner member may be employed as a motor or generator, and the current cut out of the outer member, leaving the outer member idle.

By the arrangement shown the inner member may be employed to generate current to magnetize the outer field, or vice versa, as required.

When the intermediate member is operated by a separate motor, for instance a steam engine, both alternating current and direct current can be collected and at the same time the inner member can be run as a motor, or can be operated as an exciter to furnish current for magnets of the generating part, or it can also be operated as a generator.

The outer element can be operated as an alternating generator and the inner element operated in phase with the outer element as an alternating current motor, by the generator current.

This machine may be installed in a home, workshop, or factory, and the outer rotating member driven by gasoline or other motor and the inner member coupled to operate various machines, for instance, the outer generator can be utilized to furnish current for electric lights while the inner member may be used as a motor to drive machines of various kinds.

Having thus described the invention, what is claimed as new is:

1. In a machine of the character set forth, a base having a pair of spaced standards mounted thereon, an upright annular housing mounted on each standard, an annular enclosed field coil mounted on said base between said standards, a hollow rotary member within said field coil carrying coil windings upon the exterior and interior thereof constituting armature and field coils respectively, a hollow stub shaft extending from each end of said rotary member through and supported by the end walls of said field coil and each terminating in a housing, bevelled gear teeth formed upon the free end of each stub shaft, a central shaft extending through said hollow shafts and beyond the ends thereof through said housings, an armature carried by said center shaft within said rotary member, a fixed gear mechanism mounted within each housing in mesh with the teeth on the adjacent stub shaft, means for transmitting reverse motion from said shaft to said rotary member through said fixed gears, and a commutator mechanism for the machine carried upon the central shaft.

2. A machine of the character set forth, comprising a base, a pair of spaced standards, carried thereon, an open end housing carried upon each standard, a plurality of bevelled pinions fixed within each housing, a main shaft extending through and beyond the end of each housing, a bevelled gear carried upon said shaft upon the outside of and meshing with said pinions, means carried by each standards for supporting the ends of the shaft, an armature carried upon said shaft, an annular casing enclosing said armature and having coil winding upon the inner and outer circumference thereof constituting field and armature coils respectively, tubular shafts surrounding said main shaft and supporting said casing thereon, gear teeth formed on the outer end of each of said tubular shafts and meshing with said fixed pinions, a field surrounding said casing, and a commutator carried upon said main shaft.

In testimony whereof, I affix my signature hereto.

JOHN C. SOMMER.